United States Patent [19]

Panek et al.

[11] 4,143,026

[45] Mar. 6, 1979

[54] PIGMENTED ABS POLYMER AND POLYAMIDES

[75] Inventors: Peter Panek; Peter Woditsch; Wolfgang Ritter; Peter Tacke, all of Krefeld, Fed. Rep. of Germany

[73] Assignee: Bayer Aktiengesellschaft, Leverkusen, Fed. Rep. of Germany

[21] Appl. No.: 760,807

[22] Filed: Jan. 19, 1977

[30] Foreign Application Priority Data

Jan. 22, 1976 [DE] Fed. Rep. of Germany ....... 2602364

[51] Int. Cl.² ............................ C08K 9/04; C08K 9/10
[52] U.S. Cl. ............................. 260/42.14; 106/308 M; 260/42.55; 260/42.56
[58] Field of Search ............... 260/42.56, 42.14, 42.55; 106/308 M

[56] References Cited

U.S. PATENT DOCUMENTS

| | | | |
|---|---|---|---|
| 3,287,290 | 11/1966 | Bray | 260/42 |
| 3,462,390 | 8/1969 | Dunn | 260/42.56 |
| 3,561,003 | 2/1971 | Lanham | 260/42.55 |
| 3,582,384 | 6/1971 | Belde | 260/42.56 |
| 3,637,571 | 1/1972 | Polovina | 260/42.56 |
| 3,755,244 | 8/1973 | Hart | 260/42.56 |

FOREIGN PATENT DOCUMENTS

| | | | |
|---|---|---|---|
| 47-36489 | 9/1972 | Japan | 260/42.56 |
| 1197503 | 7/1970 | United Kingdom. | |

*Primary Examiner*—James H. Derrington
*Attorney, Agent, or Firm*—Sprung, Felfe, Horn, Lynch & Kramer

[57] ABSTRACT

A pigmented high-impact plastic comprising by weight about
(a) 40 to 99.9% of ABS polymer or polyamide, and
(b) 0.1 to 60% by weight of a pigment or filler preparation made up of
30 to 70% by weight of pigment or filler, and
70 to 30% by weight of a polymer comprising units of the formula $(CHR-CH_2)_n$ where R is hydrogen or methyl and n is a number from about 50 to 40,000.

The pigment or filler preparation is made by mixing an aqueous suspension of the pigment or filler with an aqueous suspension of the polymer comprising $(CHR-CH_2)$ units and drying the joint suspension. The plastics so pigmented are characterized by high impact strength, often greater than the unpigmented plastics.

4 Claims, No Drawings

PIGMENTED ABS POLYMER AND POLYAMIDES

A large number of the plastics used today are colored with pigments before final processing. In the case of plastics which, by virtue of their weak natural color, require only a low pigmenting level, and in the case of plastics end products with little dimensional stability, significant problems arise in regard to the divisibility and dispersibility of the pigments and also in regard to their optical effectiveness in the particular matrix. These difficulties may be eliminated by using pigment preparations which are obtained in accordance with the prior art by working powder-form pigments into molten granulates of the plastics material to be colored and/or of a compatible plastic material by means of suitable dispersion units (extruders, internal kneaders, etc.), of. Ullmann, Enzyklopadie der technischen Chemie, 3/11, 84 (1960).

Dimensionally stable and, in some cases, high-impact plastics, such as ABS-polymers, glass-fiber-reinforced and non-reinforced polyamides and polycarbonates, behave differently. When pigmented with isometric particles, they undergo an undesirable reduction in their mechanical strength properties, more especially their impact strength, (notched bar test), with increasing pigmenting level in dependence upon their natural color. Hitherto, attempts to counteract this deterioration in the mechanical properties by using pigment preparations obtained by working powder-form pigments into thermoplastic polymer granulates, such as polyethylene, polyvinyl chloride and polystyrene, by the method described above have not produced the required result. In addition, the process by which pigment preparations such as these are produced is elaborate, expensive and is unable to eliminate the danger of damage to the polymeric supporting material and pigment (reduction in the molecular weight of sensitive plastics by mechanical stressing in kneaders and similar dispersion machines; thermal damage of the supporting material and pigment because the pigment is worked in at temperatures in the range of from approximately 250° to 350° C).

In addition to these processes, there are processes for producing pigment and filler preparations in which polymeric coatings are applied to solids in powder form, paste form or suspension form. In one variant of processes such as these, dissolved polymers or polymers suspended in water or in organic solvents are deposited onto the surfaces of the inorganic solids by coagulation (heat, addition of electrolyte or acid), by precipitation with inorganic salts which form substantially insoluble deposits with the polymers, or by altering the solubility ratios (by adding suitable liquids in which the polymer is insoluble). The other variant is graft polymerization in which suitable monomers are polymerized in the presence of the suspended inorganic solids.

According to British Patent Specification No. 954,938, titanium dioxide is mixed with an aqueous polyvinyl chloride suspension, while according to German Offenlegungsschrift No. 2,204,223 suspensions of organic or inorganic pigments, such as are obtained during preparation or formulation, are mixed with a suspended ethylene polymer in the presence of from 2 to 10% by weight of an alkali metal silicate. In both cases, the suspension obtained is coagulated by heating and/or by the addition of an electrolyte and the pigment preparation is worked up by several elaborate process steps, such as filtration, washing, drying and grinding. According to German Offenlegungsschrifts Nos. 2,325,520 and 2,327,182, fillers are ground in the presence of polymers dissolved in organic solvents, and the solvent is subsequently removed. In view of the ready volatility and inflammability of the organic solvents used, these processes necessitate special precautionary measures which are difficult to carry out and which have to be additionally introduced during production of the pigments and fillers. Also, recovery of the solvents is required both for reasons of cost and for reasons of pollution control. Known graft polymerization processes for the production of pigment and filler preparations are carried out under the action of mechanical energy (German Offenlegungsschrift No. 2,204,707) or high-energy radiation or electrical discharges (Japanese Patent Specification No. 74-040791). Other processes are based on changes in phase on the surface of the solids (German Offenlegungsschrifts Nos. 2,237,256; 2,309,049; 2,309,050 and 2,309,150) for creating active centers, removing the pigment or filler present in the aqueous suspension before polymerization into the monomer-containing organic phase (German Offenlegungsschrift No. 1,495,135 and U.S. Pat. No. 3,133,893) or on the polymerization of monomers which contain active terminal groups and polar segments and which are permanently adsorbed on the surface of the particular solids (German Offenlegungsschrift No. 1,792,075). Some of these processes are difficult to carry out on a commercial scale, while others can only be applied to special products.

Similarly, the graft polymerization of silicon dioxide can only be used for special applications. In the graft polymerization of silicon dioxide according to German Offenlegungsschrift No. 2,164,713, polymers are fixed by covalent bonding to surface silicon atoms by means of complicated multistage preliminary reactions. Finally, solution, precipitation and emulsion polymerization processes initiated radically, anionically or cationically in organic or aqueous systems are known (British Patent Specification No. 1,078,173; French Patent Specification No. 2,147,395). According to U.S. Pat. No. 3,884,871, the coating of titanium dioxide normally required for this process step is carried out by:

(a) adding a dispersion aid to the aqueous pigment suspension;

(b) adding an anchoring agent to the pigment suspension and adjusting the solids content;

(c) adding an organic vinyl monomer to the pigment suspension;

(d) polymerizing the monomer and the anchoring agent in the presence of a polymerization catalyst.

In addition, graft polymerization processes of this kind frequently require inert gas atmospheres, coagulation of the pigments coated with the graft polymer by heating or by the addition of an electrolyte and also elaborate working up of the grafted products by filtration, washing, drying and grinding.

In the processing of pigment and filler preparations, which inhibit the deterioration in mechanical properties and which are obtained by one of the processes described above, with high-impact plastics, the polymers or copolymers used for modifying the surface of the solids have to be very similar to or at least compatible with the plastic matrix. Thus, according to German Offenlegungsschrift No. 2,105,487, polycarbonate is colored with a pigment preparation obtained by working rutile into a mixture of polymethyl methacrylate and the base polymer to be colored (polycarbonate) at the melting temperature of the polymer. According to German Offenlegungsschrift No. 1,939,544, inorganic fillers for thermoplastic materials (for example calcium carbonate) are surface-modified by coating the solids particles by a precipitation copolymerization process. The monomer combinations used and claimed on the one hand provide for chemical or adsorptive bonding to the surface of the filler and on the other hand establish in the copolymer the required compatibility with the thermoplastic material to be filled.

Accordingly, different solids and also different plastic matrices to be colored require special polymer or copolymer coatings adapted to their chemical reactivity or adsorption properties.

Accordingly, the pigmenting or filling of high-impact plastics with improved mechanical properties presupposes the availability of solids preparations which can only be obtained by processes which are either labor- and cost-intensive or which cannot be universally applied. In addition, a wide range of these products has to be available because the polymer present in the preparation has to be tailored in its suitability both to the solids used and also to the plastic matrix to be colored.

The object of the present invention is to provide pigmented plastics with improved mechanical properties, in some cases exceeding the strengths of the non-pigmented plastic material, which do not require either complicated graft polymerization processes or elaborate working-up conditions for the pigment preparation such as coagulation, filtration, washing and grinding, but instead can be obtained by simple, universally applicable and inexpensive process steps, and which are suitable for coloring several plastic matrices.

The present invention relates to pigmented high-impact plastics based on ABS-polymers and polyamides comprising
(a) about 40 to 99.9% by weight of an ABS-polymer or polyamide, and
(b) about 0.1 to 60% by weight of a pigment or filler preparation made up of about
30 to 70% by weight of a pigment or filler, and
70 to 30% by weight of a polymer containing structural elements of the type $(CHR-CH_2)_n$ where R is hydrogen or methyl and n is a number from about 50 to 40,000.

The invention also relates to the use of inorganic pigments or fillers coated with polymers, the polymers comprising structural elements of the type $(CHR-CH_2)_n$ where R = H or $CH_3$ and n = a number from about 50 to 40,000, for incorporation into high-impact plastics based on ABS-polymers or polyamides, the organically coated pigments or fillers being obtained by the joint drying of the aqueous pigment or filler suspensions and the aqueous polymer suspensions, optionally in the presence of dispersion aids.

It has surprisingly been found that, by using pigments or fillers coated with certain polymers, it is possible where they are incorporated into ABS-polymers and polyamides to obtain plastic articles with improved mechanical properties although ABS-polymers and polyamides are not normally compatible with polyethylene, polypropylene or copolymers of polyethylene and polypropylene.

The pigment or filler preparations to be used are easy to produce. ABS-polymers and glass fiber reinforced or non-reinforced polyamides are pigmented with preparations obtained by intensively mixing aqueous suspensions or pastes of inorganic pigments or fillers containing at least about 30% by weight of pigment or filler, such as are obtained during the production or formulation of the pigments or fillers, optionally in the presence of a dispersion aid, and an aqueous polymer suspension (polymer = polyethylene or polypropylene or copolymers of ethylene and propylene) containing about 30% to 70% by weight and preferably more than about 40% by weight of the polymer, and subsequently spray-drying the resulting suspensions at temperatures in the range of about 30° to 200° C.

Any organic pigments or fillers may be used for producing the pigment or filler preparations used in accordance with the invention, the following being mentioned by way of example: titanium dioxide of the anatase or rutile structure, magnetic and non-magnetic iron oxides, chromium oxides, zinc sulfides, cadmium sulfides, magnesium titanates, calcium carbonates, talcum, aluminosilicates, dolomite, calcium sulfate, barium sulfate, zinc oxide and carbon black. Pigment preparations based on titanium dioxide are particularly suitable for incorporation into ABS-polymer or polyamides. In this case, the plastic articles obtained have mechanical strength values distinctly superior to the corresponding values of the non-pigmented plastic material or of the plastic material pigmented with powder-form pigments by standard processes.

The pigments or fillers are mixed with the aqueous polymer suspension containing the organic supporting material for producing the pigment or filler preparations at a suitable stage of the production or formulation process of the pigments or fillers, preferably before isolation of the pigments or fillers from the aqueous phase, in the case of titanium dioxide pigments after the inorganic aftertreatment, for example with aluminum oxide aquate. The aqueous polymer suspensions used, preferably polyethylene suspensions, contain from 30 to 70% by weight and preferably more than 40% by weight of the polymer which has a relatively low to medium molecular weight of about 2000 to 1,000,000 and an average particle diameter of about 0.01 to 200 $\mu$m, preferably about 0.05 to 20 $\mu$m. The mixing ratios of the combined pigment or filler and polymer suspensions are selected in such a way that the proportion by weight of polyethylene in the final pigment preparation amounts to between about 10 and 50% by weight and preferably to between about 30 and 40% by weight. The suspensions are spray-dried together at temperatures in the range of about 30° C. to 200° C. The conditions in the spray dryer may readily be adjusted in such a way that the pigment preparations are directly obtained in the powder or granulate form suitable for pigmenting plastics.

Working of the pigment or filler preparations into the plastics to be pigmented or filled is not critical and is carried out by any one of the known processes suitable for coloring with pigment or filler powders or conventionally obtained pigment or filler preparations. Depending upon the plastic material to be pigmented, the pigment or filler preparation is used in a quantity corresponding to up to about 20% by weight of pigment or filler, based on the plastic articles obtained.

The production of two pigment preparations and their advantageous use in accordance with the invention for pigmenting high-impact plastics is described by way of example hereinbelow. Unless otherwise stated, parts represent parts by weight and percentages percent by weight.

PIGMENT PREPARATION A 500 parts of an aqueous polyethylene suspension (40% by weight solids; average molecular weight approximately 30,000; softening point 109°–112° C.) were added with intensive stirring to 500 parts of an aqueous dry filter sludge containing 60% by weight of titanium dioxide (aftertreated with $TiO_2$ and $Al_2O_3$; obtained by the sulfate process) and 0.9 part of sodium polyphosphate. After stirring for 15 minutes, the mixture was spray-dried under the following conditions:

The combined aqueous phases were atomized by means of a two-component nozzle (diameter 1.5 mm) under an atomizing pressure of 1.5 bars. The gas temperatures in the spray dryer were as follows:

Temperature on entry 205° C., temperature on exit 85° to 90° C.

A granular pigment preparation (average particle diameter approximately 1 to 2 mm) was obtained, consisting of 60% by weight of titanium dioxide and 40% by weight of polyethylene.

PIGMENT PREPARATION B 537 parts of an aqueous dry filter sludge containing 55.8% by weight of titanium dioxide (aftertreated with $TiO_2$ and $Al_2O_3$, produced by the chloride process) were intensively mixed with 1.5 parts of sodium polyphosphate, followed by the addition with stirring of 683 parts of an aqueous polyethylene suspension (43% by weight solids; average molecular weight approximately 30,000; softening point approximately 120° C.). After stirring for 30 minutes, the mixture was spray-dried in the same way as described above: atomizing pressure 5.0 bars; temperature of gas on entry into the spray dryer 170° C., temperature of gas on exit 52° C. A finely divided pigment preparation (average particle diameter approximately 200 μm) containing 50% by weight of titanium dioxide and 50% by weight of polyethylene was obtained.

EXAMPLE 1

In accordance with the invention, pigment preparation A prepared as described above was worked into nylon-6 in granulate form with a glass fiber content of 30.6% by weight (relative viscosity 3.17, as measured in a solution of 1 g of polymer in 99 g of m-cresol at 25° C.; length of the glass fibers approximately 200 μm, diameter approximately 10 μm). To this end, a quantity of pigment preparation A corresponding to 1% by weight of titanium dioxide (based on the glass fiber reinforced and pigmented polyamide) was extruded with a corresponding quantity of polyamide in a single-screw extruder (Reifenhauser S 30). 10 Standard small test bars were then injection-molded in an injection molding machine (Arburg 300) at a mold temperature of 100° C. The impact strengths of these standard small test bars were determined in accordance with DIN 53453 (ISO/R 179-1961) and the average value was calculated from 10 individual measurements. An average value of 45.9 $KJ/m^2$ was obtained.

EXAMPLE 2

As in Example 1, pigment preparation B obtained as described above was worked in accordance with the invention into a glass fiber reinforced polyamide with the same parameters as in Example 1. The pigmenting level was again equivalent to 1% by weight of $TiO_2$ (based on the pigmented polyamide). An average impact strength of the pigmented plastic material of 50.2 $KJ/m^2$ was determined on 10 standard small test bars in accordance with DIN 53 453.

EXAMPLE 3

In order to characterize the starting material to be pigmented, the unpigmented glass fiber reinforced polyamide described in detail in Example 1 was processed into 10 standard small test bars in the molds described in Example 1, and the impact strength of these standard small test bars was determined in accordance with DIN 53 453. It amounted to 55.3 $KJ/m^2$.

EXAMPLE 4

For comparison purposes, 1% by weight of titanium dioxide (not treated with polymeric material; end product of the pigment suspension used for preparing pigment preparation A), based on pigmented polyamide, was worked into glass fiber reinforced polyamide from the production batch characterized and used in Example 1. To this end, the pigment powder was first applied to the polyamide granulate by drum-coating and the product was subsequently homogenized in a single-screw extruder. In order to determine the impact strength of the pigmented plastic material, the procedure described in Example 1 was again adopted. A value of 35.4 $KJ/m^2$ was obtained.

EXAMPLE 5

Another Comparison sample was obtained by working in 1% by weight of titanium dioxide (not treated with polymeric material; end product of the pigment suspension used for producing pigment preparation B) in accordance with Example 4.

The impact strength of the pigmented plastic material obtained, determined in accordance with Example 1, amounted to 36.1 $KJ/m^2$.

EXAMPLE 6

For comparison purposes, a pigment preparation conventionally produced by the co-extrusion of 30% by weight of titanium dioxide powder and 70% by weight of nylon-6 (relative viscosity 3.11, as measured in a solution of 1g of polymer in 99 g of m-cresol at 25° C.; no glass fiber reinforcement) was worked into the glass fiber-reinforced polyamide from the production batch used in Example 1 (1% by weight of $TiO_2$ in the mass). An average impact strength of 35.6 $KJ/m^2$ was measured for the pigmented material in accordance with DIN 53 453.

EXAMPLE 7

The procedure of Example 6 was repeated using a pigment preparation conventionally obtained by the co-extrusion of 40% by weight of titanium dioxide powder and 60% by weight of a standard commercial-grade high pressure polyethylene (Lupolen ® 1800 S, a product of BASF) (1% of $TiO_2$ in the mass). An average impact strength of 38.6 $KJ/m^2$ was determined under the same conditions as in Example 1.

Examples 1 to 7 clearly show the advantageous use of pigment preparations A and B in accordance with the invention for pigmenting high impact polyamide with improved mechanical properties.

EXAMPLE 8

In order to characterize the starting material to be pigmented for the following Examples 9 and 10, non-pigmented ABS graft polymer (standard injection-molded type, average melt index 14 g in 10 minutes at 220° C./10Kp) from the same production batch as also used in the following Examples, was processed in the same way as in Example 1 to form standard small test bars which were used for determining impact strength (notched bar test) ($a_K$) and elongation at break ($E_R$) in accordance with DIN 53 453 and DIN 53 455 (ISO/R 527 or ASTM/D 638/68). The average values from 10 individual measurements are shown in Table 1 below in dependence upon the particular pigmenting level.

EXAMPLE 9

Pigment preparation A prepared as described above was worked in accordance with the invention into high impact ABS polymer. To this end, a quantity of pigment preparation A corresponding to 5% by weight and 10% by weight of titanium dioxide (based on the pigmented ABS polymer) was processed with a corresponding quantity of ABS polymer in the molds described in Example 1 to form standard test bars of which the impact strength (notched bar test) ($a_K$) and elongation at break ($E_R$) are quoted in Table 1 below as averages of 10 individual measurements.

EXAMPLE 10

For comparison purposes, 5% by weight and 10% by weight of titanium dioxide (not treated with polymeric material; end product of the pigment suspension used for producing pigment preparation A), based on the pigmented ABS polymer, were worked in the same way as in Example 4 into ABS polymer from the production batch already used in Examples 8 and 9. The average values for impact strength (notched bar test) ($a_K$) and elongation at break ($E_R$) obtained in dependence upon the pigmenting level in accordance with Example 8 are also quoted in the Table:

Table

Impact strength (notched bar test) ($a_K$) and elongation at break ($E_R$) of pigmented and non-pigmented ABS polymer according to Examples 8 to 10.

| Pigmenting substance | Pigmenting level (% by weight of $TiO_2$) | Impact strength (notched bar test) $a_K$ ($kJ/m^2$) | Elongation at break) $E_R$ (%) | Example |
|---|---|---|---|---|
|  | 0 | 9.9 | 9.3 | 8 |
| pigment preparation A | 5 | 11.7 | 13.4 | 9 |
| pigment preparation A | 10 | 11.6 | 11.9 | 9 |
| unmodified $TiO_2$; end product of the pigment suspension used for the production of preparation A | 5 | 9.8 | 9.0 | 10 |
| | 10 | 9.2 | 8.6 | 10 |

Examples 8 to 10 show the advantageous use in accordance with the invention of the polyethylene-coated titanium dioxide pigments, for example in the form of pigment preparation A, for pigmenting high-impact ABS polymers. It is possible to obtain pigmented ABS polymers whose impact strength (notched bars) and elongation at break are distinctly superior to the corresponding values of the unpigmented polymer and the polymer pigmented with powder-form pigments.

In addition to nylon-6, the polyamide may comprise nylon-66, nylon-11, nylon-612 or any of the other commercially available polyamides.

It will be appreciated that the instant specification and examples are set forth by way of illustration and not limitation, and that various modifications and changes may be made without departing from the spirit and scope of the present invention.

What is claimed is:

1. A process for producing high-impact plastic comprising mixing an aqueous suspension containing about 40 to 70 parts by weight of titanium doxide with an aqueous suspension containing about 60 to 30 parts by weight of a polymer comprising units of the formula $(CHR—CH_2)_n$ where R is hydrogen or methyl and n is a number about from 50 to 40,000, including a dispersion aid in the joint suspension, spray drying the joint suspension to form a pigment preparation, and mixing about 0.1 to 60 parts by weight of the preparation with about 99.9 to 40 parts by weight of ABS polymer or polyamide.

2. A high-impact molded plastic article produced by molding a composition produced by the process of claim 1.

3. A pigmented high-impact plastic according to claim 2, wherein the polymer comprises ABS.

4. A pigmented high-impact plastic according to claim 2, wherein the polymer comprises polyamide.

* * * * *